(12) United States Patent
Taniguchi

(10) Patent No.: US 7,119,519 B2
(45) Date of Patent: Oct. 10, 2006

(54) CONTROL APPARATUS FOR ON-VEHICLE GENERATOR THAT SENDS POWER FROM THE BATTERY TO THE FIELD WINDING AND FROM THE FIELD WINDING BACK TO THE BATTERY

(75) Inventor: Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/619,453

(22) Filed: Jul. 16, 2003

(65) Prior Publication Data

US 2004/0061482 A1 Apr. 1, 2004

(30) Foreign Application Priority Data

Jul. 18, 2002 (JP) ............... 2002-209005

(51) Int. Cl.
*H02H 7/06* (2006.01)
*H02P 9/00* (2006.01)
*H02P 11/00* (2006.01)

(52) U.S. Cl. ............... 322/28; 322/25; 322/24
(58) Field of Classification Search ............ 322/20, 322/24, 25, 26, 28; 320/140, 122
See application file for complete search history.

(56) References Cited

U.S. PATENT DOCUMENTS

| | | | |
|---|---|---|---|
| 3,843,921 A * | 10/1974 | Hill | 322/28 |
| 4,516,066 A * | 5/1985 | Nowakowski | 320/123 |
| 4,754,212 A * | 6/1988 | Mashino | 322/28 |
| 5,231,344 A * | 7/1993 | Marumoto et al. | 322/14 |
| 5,448,154 A * | 9/1995 | Kanke et al. | 322/28 |
| 5,510,695 A * | 4/1996 | Tanaka et al. | 322/25 |
| 5,719,485 A * | 2/1998 | Asada | 322/28 |
| 5,747,971 A * | 5/1998 | Rozman et al. | 322/10 |
| 5,780,996 A * | 7/1998 | Kusase et al. | 322/28 |
| 5,783,928 A * | 7/1998 | Okamura | 320/122 |
| 5,850,133 A * | 12/1998 | Heglund | 318/700 |
| 5,986,436 A * | 11/1999 | Liu | 320/140 |
| 6,313,613 B1 * | 11/2001 | Iwatani et al. | 322/12 |
| 6,329,797 B1 * | 12/2001 | Bluemel et al. | 322/28 |
| 6,469,468 B1 * | 10/2002 | Hatsuda et al. | 318/701 |
| 6,664,767 B1 * | 12/2003 | Takahashi et al. | 322/28 |

* cited by examiner

*Primary Examiner*—Julio C. Gonzalez
(74) *Attorney, Agent, or Firm*—Oliff & Berridge PLC

(57) ABSTRACT

A control apparatus for an on-vehicle generator is provided. The generator, driven to rotate by an on-vehicle engine, is provided with stator windings, rectifiers, a field winding, and a voltage control apparatus (i.e., the control apparatus for the on-vehicle generator). The voltage control apparatus comprises a switching element (including power transistors, for example) selectably and electrically connects or disconnects a current path between the field winding and a power supply to provide the field winding with current; a storage element (for example, a battery); and a regeneration element (for example, free wheel diodes) provides the storage element with current flowing through the field winding when the switching element is turned off.

14 Claims, 6 Drawing Sheets

CONTROL APPARATUS FOR ON-VEHICLE GENERATOR THAT SENDS POWER FROM THE BATTERY TO THE FIELD WINDING AND FROM THE FIELD WINDING BACK TO THE BATTERY

BACKGROUND OF THE INVENTION

1. Field of the Invention

The present invention relates to a control apparatus for an on-vehicle generator mounted on vehicles, such as automobiles and autotrucks, and an on-vehicle power supply system using the control apparatus.

2. Description of the Related Art

Recently, there has been a rise in demands for both high power and high efficiency of on-vehicle generators. To meet such demands, various countermeasures have been taken. One proposed countermeasure is to use an on-vehicle generator in which a Rundel-type pole core functioning as a rotor is provided and a permanent magnet is placed in a clearance between uniform portions of the core so as to increase effective magnetic flux.

However, there is a fear that such permanent magnet may be broken due to various reasons such as vibration transmitted from the car body. In addition, both of the number of parts and the number of man-hours are obliged to rise. Thus the conventional on-vehicle generator has encountered the problems resulting from durability and production cost. It has therefore been considered that, in usual cases, improvement of a field winding of the generator is more advantageous than employment of the permanent magnet.

In order to improve the field winding for high output power and high efficiency, there is known a design technique of strengthening an excitation ampere turn value of the field winding so that a maximized excitation field is obtained. Under such a circumstance, a growing demand for shortening a time constant of the field winding has been created as another design technique. Thus a current main stream in the design begins with selecting, as the field winding, smaller-number-of-turns and low-resistance winding, rather than a multitudes-of-turns and high-resistance winding.

In addition to the foregoing demands for high-power and high-efficiency, a demand for a compact generator is still persistent, so that a trend in the design is making the magnetic poles of the generator compact in size and less in weight. When such a design is made, a magnetic path for the field is forced to be smaller in the cross section, thus a magnetic permeance value being smaller, thus the magnetic path being apt to be saturated easily. Hence, to generate a necessary amount of interlinkage magnetic flux against a large amount of magnetic resistance, the excitation current tends to be increased more.

By the way, in the general on-vehicle generator, the excitation current is produced by using an output current from an in-vehicle battery or by using part of an output current generated by an on-vehicle generator itself. Hence the larger the excitation current, the higher a loss due to the excitation, thus facing another problem.

FIG. 1 explains connections of a field winding equipped in a conventional on-vehicle generator. As shown in FIG. 1, the conventional on-vehicle generator has a switch 102 made up of a power transistor connected in series to a field winding 100 and a free wheel diode 104 connected in parallel to the field winding 100. Controlling the switch 102 to be turned on/off suppresses an excitation current flowing through the field winding 100, providing an output voltage limited within a predetermined range of allowance.

FIG. 2 shows temporal changes in both the excitation current and a battery current in the conventional on-vehicle generator including the circuitry shown in FIG. 1. As understood from FIG. 2, a current (battery current) flows from the battery 106 to the field winding 100 during an interval of time when the switch 102 is in the on-state. Energy supplied by this battery current is partly preserved as magnetic energy by the field winding 100. During an interval of time when the switch 102 is in the off-state, this magnetic energy causes the excitation current to circulate through a closed loop formed by the field winding 100 and free wheel diode 104. While circulating along the closed loop, the excitation current is converted into Joule heat due to both of the resistance of the field winding 100 and a forward voltage drop across the free wheel diode 104, so that magnetic energy is dissipated.

Therefore, when it is desired to raise the amount of the excitation current to realize a compact, high-output-power, and high-efficiency on-vehicle generator as described above, there are still other problems that the capacity of the power supply should be increased and a generation loss is increased because there is an increase in the dissipation energy converted into heat after the temporal storage in the field winding.

SUMMARY OF THE INVENTION

The present invention has been made to overcome the above problems. An object of the present invention is to provide a control apparatus for an on-vehicle generator and an on-vehicle power supply system using the same, which are able to reduce a generation loss, so that the capacity of an exciting power supply can be lowered in designed thereof.

In order to accomplish the foregoing problems, the present invention provides, as one aspect thereof, a control apparatus for an on-vehicle generator provided with a stator winding and a field winding and driven to rotate by an on-vehicle engine. The control apparatus comprises a switching element configured to selectably and electrically connect or disconnect a current path between the field winding and a power supply to provide the field winding with current; a storage element; and a regeneration element configured to provide the storage element with current flowing through the field winding when the switching element is turned off.

In addition, the present invention provides, as another aspect thereof, an on-vehicle power supply system comprising the control apparatus for the on-vehicle generator described above, a power supply, and a storage element electrically connected to the power supply in parallel.

Accordingly, the above configurations of the control apparatus and the power supply system make it possible to surely collect magnetic energy temporarily preserved in the field winding in the form of electric energy, without dissipating the magnetic energy in the form of heat. The capacity of the power supply can be decreased, in addition to a reduction in the generation loss.

It is preferred that the current flowing through the field winding when the current flowing through the field winding is supplied to the storage element is the same in a current flowing direction as the current flowing through the field winding when the power supply provides the field winding with current. Thanks to this configuration, the current flowing through the field winding in response to turning on the switching element is allowed to continuously flow in the same direction as the direction along which the current has flown during the interval of time when the switching element has been in the on-state. Hence, the current directions are the same in the generation and charge (storage in the regeneration), resulting in a more improved efficiency in the regeneration.

It is still preferred that the field winding has two terminals, the power supply has positive and negative terminals, and the storage element has positive and negative pole terminals; wherein the switching element is provided with a first switch placed to connect to one terminal of the field winding and the positive terminal of the power supply and a second switch placed to connect to the other terminal of the field winding and the negative terminal of the power supply; and the regeneration element is provided with a first diode placed to connect to the one terminal of the field winding and the negative pole terminal of the storage element and a second diode placed to connect to the other terminal of the field winding and the positive pole terminal of the storage element. This configuration allows the storage element to be connected to the field winding in a steadier manner in the reverse polarities of the storage element when the switching element is turned off. Particularly, using the diode will eliminate the need for controlling the regeneration element in a complicated manner, thus providing simplified circuitry.

Still preferably, the field winding has two terminals, the power supply has positive and negative terminals, and the storage element has positive and negative pole terminals; wherein the switching element is provided with a first switch placed to connect to one terminal of the field winding and the positive terminal of the power supply and a second switch placed to connect to the other terminal of the field winding and the negative terminal of the power supply; the regeneration element is provided with a third switch placed to connect to the one terminal of the field winding and the negative pole terminal of the storage element and a fourth switch placed to connect to the other terminal of the field winding and the positive pole terminal of the storage element; and an on/off control element configured to bring the third and fourth switches into an off-state when the first and second switches is in an on-state and to bring the third and fourth switches into an on-state when the first and second switches is in an off-state. When using lower-resistance elements, such as MOSFETs (metal-oxide semiconductor field-effect transistors), as the third and fourth switches, a loss in the regeneration can be lessened, compared to using the diode. The regeneration efficiency can therefore be raised more.

It is also preferred that wherein the on/off control unit is configured to turn off the third and fourth switches when the current flowing through the field winding becomes zero. This will avoid a backward direction from flowing through the field winding, reducing a loss in the excitation of the field winding, with maintaining the stability of control of voltage to be generated. Further, if a backward current is generated, such a current is forced to be discharged from the storage element. The prevention of the backward current will provide an additional advantage that the discharge from the storage element is suppressed.

By way of example, the on/off control unit is configured to turn on and off the first and second switches at intervals of time less than 1/10 of a time constant of the field winding. This is effective in gaining highly stabilized voltage control and collecting steadily a decaying current flowing in the regeneration.

DETAILED DESCRIPTION OF PREFERRED EMBODIMENTS

A preferred embodiment of the present invention will now be described in connection with FIGS. 3 to 6.

Figure 3:
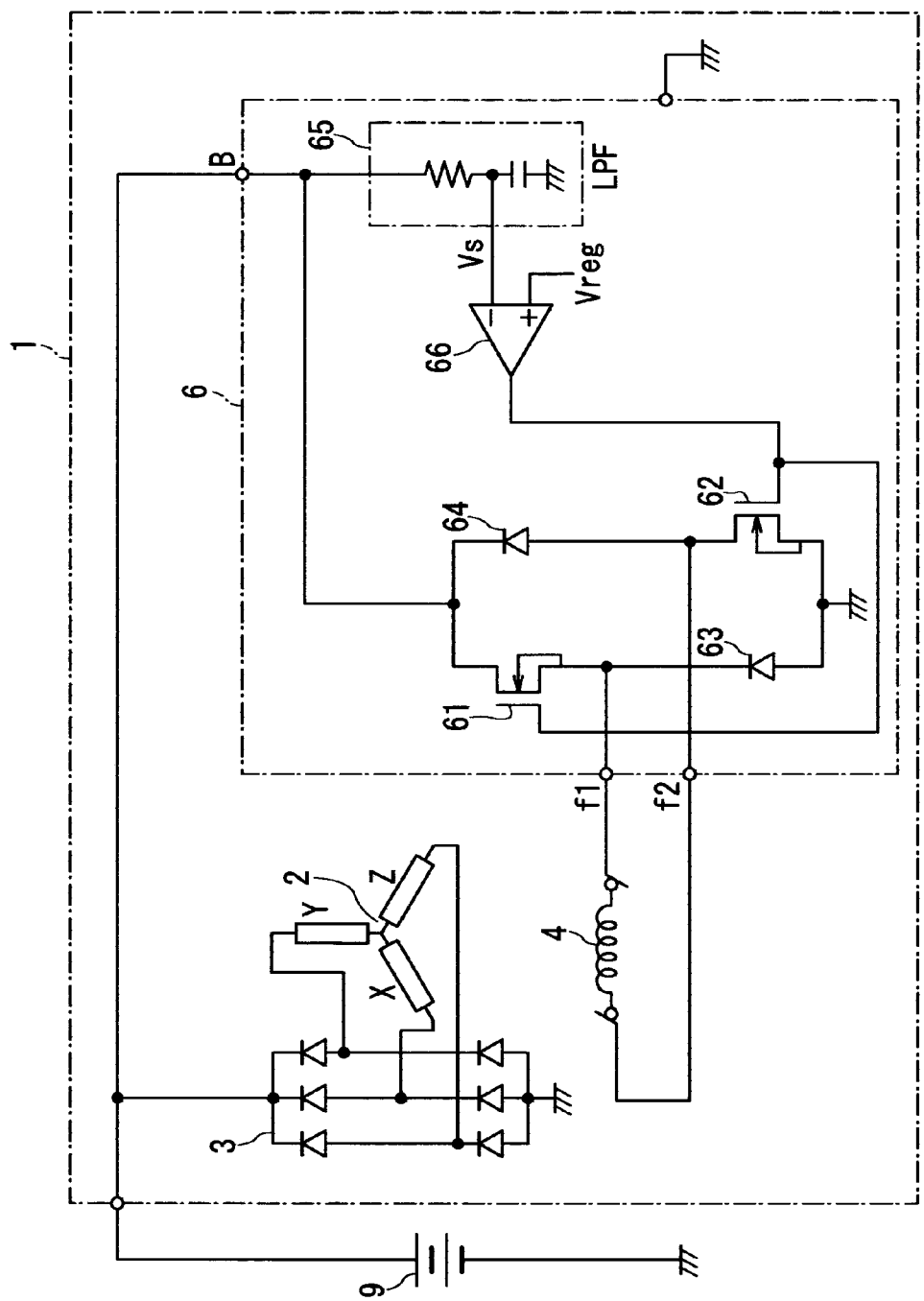
FIG. 3 is a circuit diagram showing an on-vehicle power supply system according to an embodiment of the present invention, the system including an on-vehicle generator.

FIG. 3 shows the circuitry of an on-vehicle power supply system according to the embodiment, in which the power supply system is equipped with an on-vehicle generator 1.

As shown in FIG. 3, the on-vehicle generator 1 according to the present embodiment is provided with stator windings 2, rectifiers 3, a field winding 4, and a voltage controller 6 serving as the control apparatus according to the present embodiment. Both of this on-vehicle generator 1 and a battery 9 mounted to a vehicle compose the on-vehicle power supply system.

The stator windings 2 are structured into multiple-phase winding (for example, three-phase windings), which are wound around stator cores to form a stator. AC (alternating current) output currents induced so as to flow through the stator windings 2 are supplied to the rectifiers 3.

The rectifiers 3 are provided in the form of a full-wave rectifying circuit to rectify AC output currents to DC (direct current) currents, and the full-wave rectifying circuit uses diodes serving as rectifying elements and being disposed phase by phase correspondingly to the stator windings 2.

The field winding 4 is disposed to generate interlinkage magnetic flux necessary for inducing voltage at the stator windings 2. This field winding 4 is wound around not-shown field poles to compose a stator.

The voltage controller 6 has the capability of adjusting an exciting current supplied to the field winding 4 in order to control an output voltage from the on-vehicle generator 1 within a predetermined range of voltage. To realize such an object, the voltage controller 6 includes, as main components, two power transistors 61 and 62, two free wheel diodes 63 and 64, an LPF (Low-Pass Filter) 65, and a voltage comparator 66.

One of the power transistors, 61, is placed to connect to both of one terminal of the field winding 4 and a positive terminal of the battery 9, and controls an exciting current to the field winding 4 in an interruption (on/off) manner. The remaining transistor 62 is placed to connect to both of the other terminal of the field winding 4 and a negative terminal of the battery 9, and also controls the exciting current in the interruption manner. Each of these power transistors 61 and 62 is composed of, for example, a power MOS FET (metal-oxide semiconductor field-effect transistor), and subjected to current supply control at the same timing with each other.

One of the free wheel diodes, 63, is disposed in the circuitry so that a cathode of the diode 63 is connected in series to the one power transistor 61 and an anode thereof is connected to the negative terminal (the ground) of the battery 9. The other free wheel diode 64 is arranged so that an anode thereof is connected in series to the other power transistor 62 and a cathode thereof is connected to the positive terminal of the battery 9.

The LPF 65 is composed of, by way of example, a serial circuit consisting of a resistor and a capacitor and is able to smoothen an output voltage of the on-vehicle generator 1.

The voltage comparator 66 has an inverting input terminal to receive a smoothened voltage Vs from the LPF 65 and a non-inverting input terminal to receive a reference voltage Vreg. Hence, if the voltage Vs is lower than the reference voltage Vreg, a voltage at an output terminal of the comparator 66 becomes "high" in level, while if the voltage Vs is equal or higher to or than the reference voltage Vreg, the voltage at the output terminal thereof becomes "low" in level. The output terminal of the comparator 66 is connected to each of gates of the two power transistors 61 and 62, with the result that the two power transistors 61 and 62 both turn "on" in response to the "high" level at the output terminal of the comparator 66 and turn "off" in response to the "low" level at the output terminal of the comparator 66.

Of the foregoing components, the power transistors 61 and 62, LPF 65, and comparator 66 function as the switching element according to the present invention; the power transistors 61 and 62 function as the first and second switch according to the present invention; the free wheel diodes 63 and 64 function as the regeneration unit and the first and second diodes of the present invention; and the battery 9 functions as the power supply and the storage unit according to the present invention.

The on-vehicle generator 1 according to the present embodiment, which has been controlled above, operates as follows.

Figure 4:
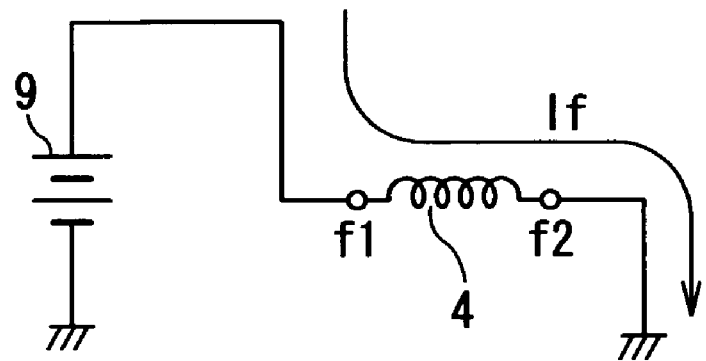
FIG. 4 is a simplified circuit diagram explaining a flow of an exciting current supplied from a battery to a field winding.

In cases where the output voltage of the on-vehicle generator 1 is below a predetermined target voltage, the voltage Vs outputted from the LPF 65 is lower than the reference voltage Vreg, whereby the output voltage of the comparator 66 is at "high" level. In this condition, the two power transistors 61 and 62 both are in the on-state. Two current paths to allow the exciting current to flow therethrough are established. One is a path circulating from the positive terminal of the battery 9, a B-terminal, the power transistor 61, and to an f1-terminal, so that the exciting current flows into the field winding 4 from the battery 9. The other is a path circulating from the field winding 4, an f2-terminal, the power transistor 62, and to the negative terminal of the battery 9, so that the exciting current flows back to the battery 9 from the field winding 4. Using these two paths, the exciting current is supplied from the battery 9 to the field winding 4. FIG. 4 illustrates a direction of the exciting current from the battery 9 to the field winding 2 through the two paths stated above.

In cases where the battery 9 supplies the exciting current to the field winding 4, an inductance component of the field winding 4 operates to preserve the exciting current in the form of magnetic energy. The energy P1 supplied to the field winding 4 is expressed by:

$$P1 = L \cdot If^2/2 + R \cdot If^2 \qquad (1),$$

wherein L is a inductance value of the field winding 4, If is a value of the exciting current, and R is a resistance value of the field winding 4. The first term in the right side of the expression (1) expresses magnetic energy preserved by the inductance of the field winding 4, while the second term therein expresses energy consumed by resistance of the field winding 4 to be converted into heat.

Figure 1:
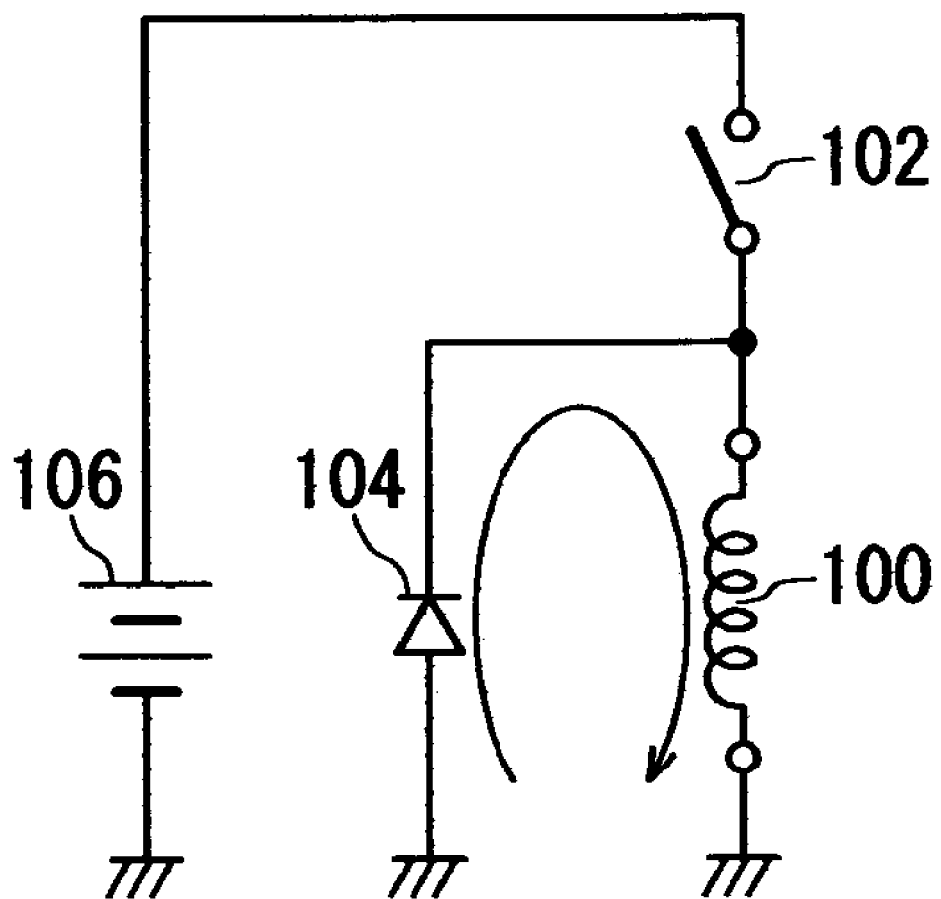
FIG. 1 shows a connected condition of a field winding equipped by a conventional on-vehicle generator.
Figure 2:
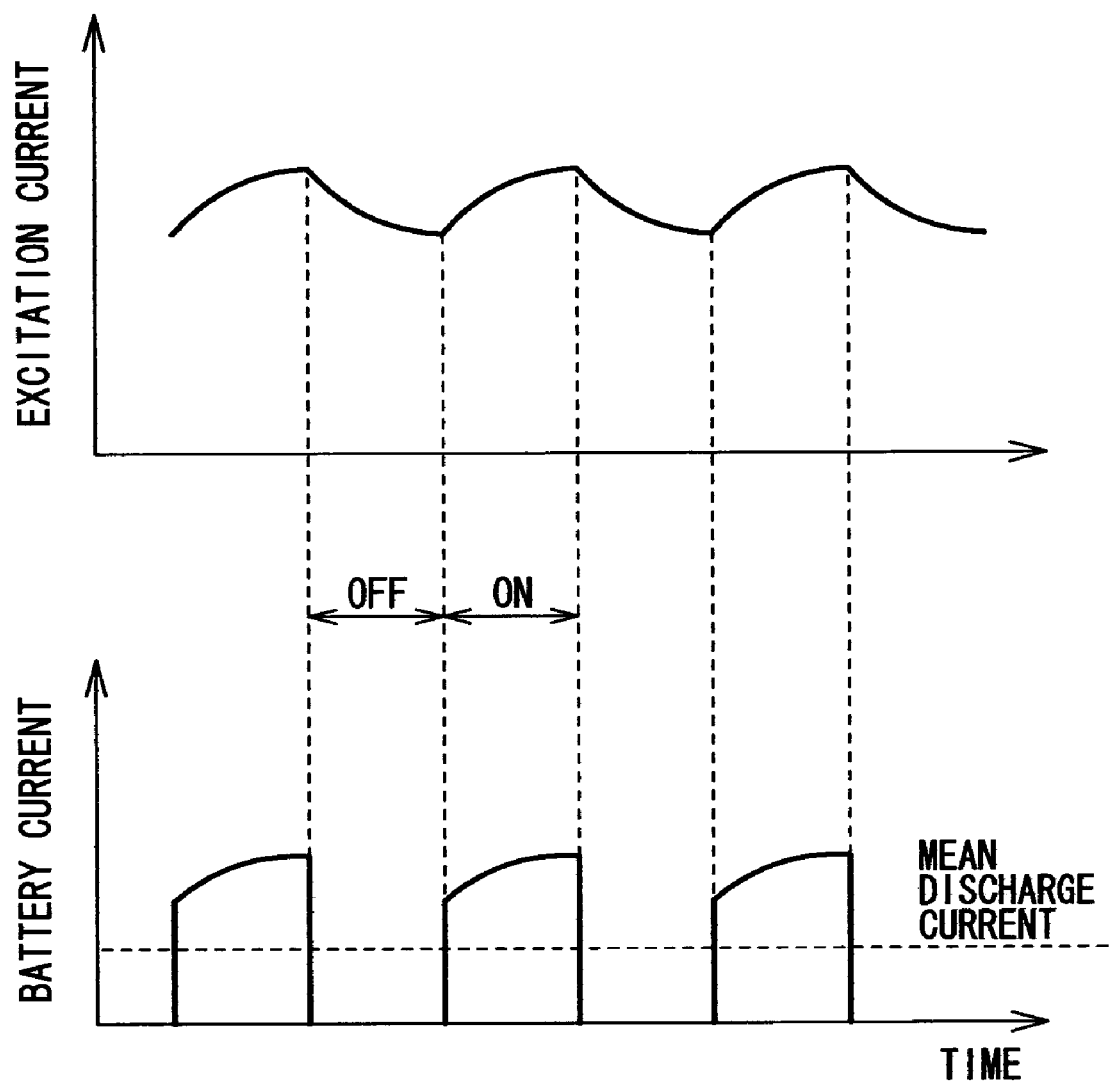
FIG. 2 shows timing charts of an exciting current and a battery current, which flow in the conventional on-vehicle generator having circuitry shown in FIG. 1.

As described based on FIG. 1, in the conventional configuration in which the free wheel diode 104 is connected in parallel to the field winding 100, the magnetic energy temporarily preserved by the field winding 4 is converted into energy consumed as heat and others due to the circulating operation of the free wheel diode 104. When the magnetic energy temporarily preserved by the field winding 4 is denoted as P2, the following is established:

$$P2 = Vd \cdot If + R \cdot If^2 \qquad (2),$$

in which Vd is a value of a forward voltage drop across the free wheel diode 104. In this expression (2), the first term in the right side expresses energy consumed by the free wheel diode 104 to be converted into heat, while the second term therein expresses energy consumed by resistance of the field winding 100 to be converted into heat.

Figure 5:
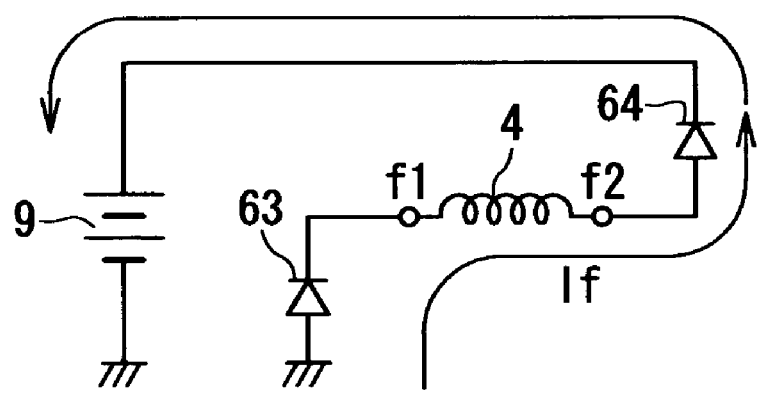
FIG. 5 is a simplified circuit diagram explaining a flow of the exciting current regenerated from the field winding to the battery.

On the other hand, when the output voltage of the on-vehicle generator 1 becomes equal or higher to or than the predetermined target voltage, the voltage Vs outputted from the LPF 65 is brought into a value equal or higher to or than a reference voltage Vreg. In this case, the voltage comparator 66 provides a low output voltage, and the two power transistors 61 and 62 both are turned off. However, since the field winding 4 has a large amount of inductance, a current to try to keep the exciting current that has just stopped supplying still flows continuously through the field winding 4, with the current decaying as the time elapses. This current is regenerated through the two free wheel diodes 63 and 64. FIG. 5 illustrates a flow of current when the exciting current is regenerated from the field winding 4 to the battery 9.

In this way, the on-vehicle generator 1 according to the present embodiment has the circuitry to regenerate into the battery 9 the exciting current that flows during the free wheel action. In this condition, magnetic energy P2 to be stored temporarily in the field winding 4 is expressed as follows:

$$P2 = Vb \cdot If + R \cdot If^2 \qquad (3),$$

in which Vb is a charge voltage between the positive and negative terminals of the battery 9.

In this expression (3), the first term of the right side shows energy returned to the battery 9 for storage, and the second term therein shows energy consumed by the resistance of the field winding 4 to be converted into heat when the regeneration is performed.

As understood from a comparison between the expression (2) explaining the conventional and the expression (3) explaining the configuration according to present embodiment, the energy dissipated into heat by the free wheel diode 104 in the conventional configuration is returned and stored in the battery 9 in this embodiment. Incidentally, because a relationship of Vb>>Vd is established, an amount dissipated by the free wheel diodes is negligible.

Figure 6:
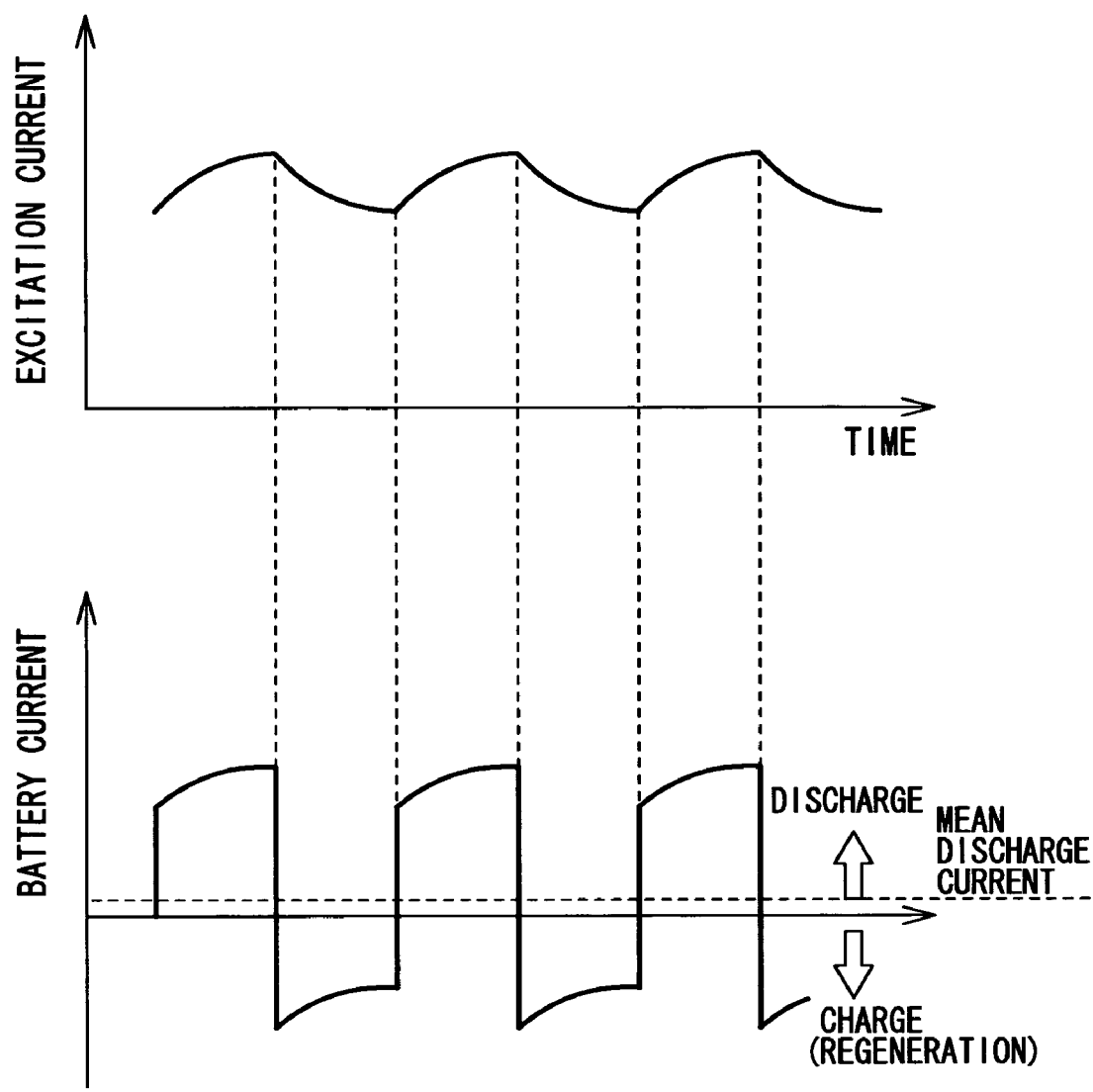
FIG. 6 shows timing charts of the exciting current and the battery current, which flow in the on-vehicle generator according to the present embodiment.

FIG. 6 illustrates changes in both the exciting current and the battery current which flow in the on-vehicle generator according to the present embodiment. As understood from the figure, while both of the power transistors 61 and 62 are turned on, the exciting current is supplied from the battery 9 to the field winding 4, so that the battery 9 is brought into its discharge state. By contrast, while both the power transistors 61 and 62 are turned off, the exciting current is returned (i.e., regenerated) from the field winding 4 to the battery 9, so that the battery 9 is brought into its charge state.

In this way, because the magnetic energy temporarily preserved by the field winding 4 is regenerated during an interval of time when the power transistors 61 and 62 are in the off-state, an amount of mean discharge current to be discharged from the battery 9 for the excitation can be reduced. Hence, in addition to a reduction in the generation loss, the capacity of the battery 9 can be lowered, while still maintaining a sufficient power supply performance.

Further, the current flowing through the field winding 4 when the power transistors 61 and 62 are in the off-state is the same in the flowing direction as the direction of the current flowing when the power transistors 61 and 62 are in the on-state. That is, the directions of the currents flowing in both the discharge state and the charge (storage) state are the same with each other, thus raising efficiency in the regeneration.

Still further, using the free wheel diodes 63 and 64 makes it possible that, when the power transistors 61 and 62 are turned off, the field winding 4 is electrically connected, with steadiness, to the battery 9 in the opposite polarities to those of the battery 9. In addition, to use the free wheel diodes 63 and 64 will eliminate the necessity of performing complicated control of those diodes 63 and 64, thereby leading to a more simplified configuration of the voltage controller 6.

By the way, the present invention is not confined to the configuration described in the above embodiment, but can be reduced into practice in a variety of other modes, without departing from the spilt of the present invention. For instance, although the foregoing configuration allows the exciting current to be regenerated through the free wheel diodes 63 and 64 in response to turning off the power transistors 61 and 62, the free wheel diodes 63 and 64 can be replaced other components including MOSFETs.

Figure 7:
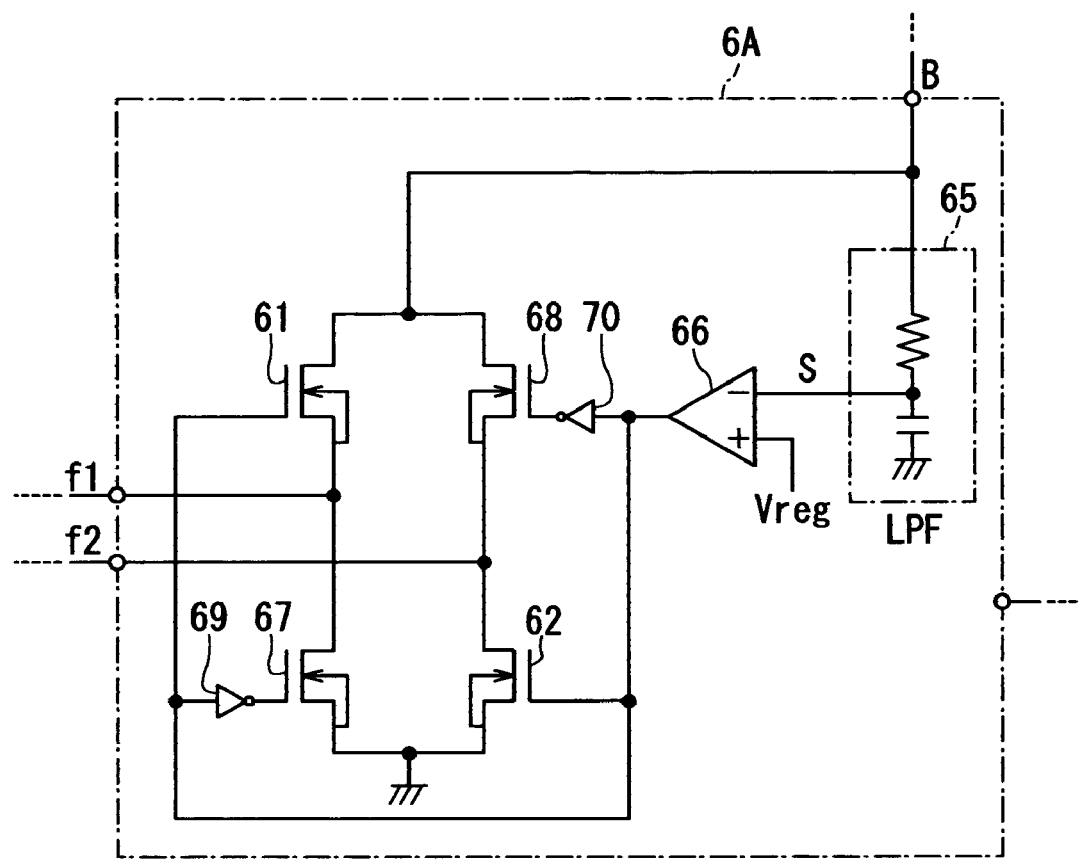
FIG. 7 shows a modification according to a voltage controller.

FIG. 7 illustrates a modification of the controller configured based on such a concept of using the MOSFETs. A voltage controller 6A shown in FIG. 7 comprises the power transistors 61 and 62, the LPF (Low-Pass Filter) 65, the voltage comparator 66, MOSFETs 67 and 68, and inverter circuits 69 and 70. The voltage controller 6A differs from the voltage controller 6 described with reference to FIG. 3 in that one free wheel diodes 63 is replaced by a combination of a MOSFET 67 and an inverter circuit 69 and the other free wheel diode 64 is replaced by the other combination of a MOSFET 68 and an inverter circuit 70. The remaining components are common to those in the foregoing embodiment, so detailed explanations thereabout will be omitted.

The above MOSFETs 67 and 68 correspond to the third and fourth switches of the present invention and the LPF 65, comparator 66, and inverters 69 and 70 in FIG. 7 compose the on/off control element of the present invention.

As shown in FIG. 7, the output terminal of the voltage comparator. 66 is coupled to not only a gate of one of the MOSFETs, 67, via the inverter circuit 70 but also a gate of the other MOSFET 68 via the inverter circuit 70. Therefore, in cases where the two power transistors 61 and 62 are in the on-state due to fact that the output of the voltage comparator 66 is high level, the two MOSFETs 67 and 68 both are turned off. In contrast, when the two power transistors 61 and 62 are in the off-state because of the low level at the output end of the voltage comparator 66, the two MOSFETs 67 and 68 both are turned on.

By performing exclusive control between temporal periods during which the power transistors 61 and 62 are in the on-state and temporal periods during which the MOSFETs 67 and 68 are in the on-state, the magnetic energy temporarily preserved by the field winding 4 can be returned (i.e., regenerated) to the battery 9 during intervals of time when the power transistors 61 and 62 are in the off-state. Furthermore, use of the MOSFETs 67 and 68 will lead to reduction in loss caused by the elements during the regeneration, compared to use of the free wheel diodes 63 and 64. Hence, the regeneration effect can be enhanced. In particularly, it is preferable that the MOSFETs 67 and 68 are switched from the on-state to the off-state responsively to the fact that the exciting current flowing through the field winding 4 becomes zero. This switching control prevents a flow of current through the field winding 4 in the backward direction, thus making it possible to reduce excitation loss without deteriorating stability in controlling the generated voltage.

A further modification concerning the storage of regenerated power can be provided as follows. In the foregoing embodiment, the configuration has been made such that the regenerated power has been stored in the battery 9, but this is not a definitive list. Alternatively, any other storage means, such as capacitor or secondary battery, can be added, independently of the battery 9, so that regenerated power is stored in the storage means. In particular, it is preferred to employ the capacitor, because there is no loss consumed by its internal impedance, unlike the battery 9 and the secondary battery, thus making use of the regenerated power in a more effective manner.

Furthermore, there is an explanation about the interruption (on/off) control of the power transistors 61 and 62. In the foregoing embodiment, no particular limitation has been given to how to decide interruption periods given to the interruptive (on/off) control of the power transistors 61 and 62, but it is still preferred that the power transistors 61 and 62 each are interrupted, for example, at an interval of time less than $\frac{1}{10}$ of a time constant of the field winding 4. This way of setting the interruption periods makes it possible to surely collect a decaying current into the battery 9 with steadiness, while still maintaining high stability in the voltage control carried out by the voltage controller 6.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

The entire disclosure of Japanese Patent Application No.2002-209005 filed on Jul. 18, 2002 including the specification, claims, drawings and summary is incorporated herein by reference in its entirety.

What is claimed is:

1. A control apparatus for use with an on-vehicle generator provided with a stator winding and a field winding and driven to rotate by an on-vehicle engine, the control apparatus comprising:

single power supplying means having positive and negative terminals, being directly connected to an output terminal of the generator, and providing current to the field winding for excitation thereof, the field winding having two terminals;

chargeable storage means having positive and negative pole terminals and being directly connected to the output terminal of the generator;

a switching circuit having a switching element configured to be turned on and off and to selectably and electrically connect or disconnect a current path between the field winding and the output terminal, the switching element including a first switch placed, through the output terminal, to connect one terminal of the field winding and the positive terminal of the power supplying means and a second switch placed to connect the other terminal of the field winding and the negative terminal of the power supplying means; and a regeneration circuit providing, through the output terminal, the storage means with the current flowing through the field winding depending on magnetic energy preserved in the field winding when the switching element is turned off, wherein the regeneration circuit includes a first diode placed to connect the one terminal of the field winding and the negative pole terminal of the storage means and a second diode placed, through the output terminal, to connect to the other terminal of the field winding and the positive pole terminal of the storage means.

2. The control apparatus according claim 1, wherein the switching element is placed in the switching circuit so that the current flowing through the field winding when the current is supplied to the storage means is the same in a current flowing direction as the current flowing through the field winding when the power supplying means provides the field winding with current.

3. A control apparatus for use with an on-vehicle generator provided with a stator winding and a field winding and driven to rotate by an on-vehicle engine, the control apparatus comprising:

single power supplying means having positive and negative terminals, being directly connected to an output terminal of the generator, and providing current to the field winding for excitation thereof, the field winding having two terminals;

chargeable storage means having positive and negative pole terminals and being directly connected to the output terminal of the generator;

a switching circuit having a switching element configured to be turned on and off and to selectably and electrically connect or disconnect a current path between the field winding and the output terminal, the switching element including a first switch placed, through the output terminal, to connect one terminal of the field winding and the positive terminal of the power supplying means and a second switch placed to connect the other terminal of the field winding and the negative terminal of the power supplying means;

a regeneration circuit providing, through the output terminal, the storage means with the current flowing through the field winding depending on magnetic energy preserved in the field winding when the switching element is turned off, wherein the regeneration circuit includes a third switch placed to connect the one terminal of the field winding and the negative pole terminal of the storage means and a fourth switch placed, through the output terminal, to connect to the other terminal of the field winding and the positive pole terminal of the storage means; and an on/off control unit bringing each of the third and fourth switches into an off-state when each of the first and second switches are in an on-state and bringing each of the third and fourth switches into an on-state when each of the first and second switches are in an off-state.

4. The control apparatus according to claim 3, wherein the on/off control unit is configured to turn off both of the third and fourth switches when the current flowing through the field winding under the off-state of both of the first and second switches becomes zero.

5. The control apparatus according to claim 4, wherein the on/off control unit is configured to turn on and off both of the first and second switches at intervals of time less than ¹/₁₀ of a time constant of the field winding.

6. The control apparatus according to claim 3, wherein the on/off control unit is configured to turn on and off both of the first and second switches at intervals of time less than ¹/₁₀ of a time constant of the field winding.

7. The control apparatus according to claims 3, wherein the switching element is placed in the switching circuit so that the current flowing through the field winding when the current is supplied to the storage means is the same in a current a current flowing direction as the current flowing through the field winding when the power supplying means provides the field winding with the current.

8. A control apparatus for use with an on-vehicle generator provided with a stator winding and a field winding and driven to rotate by an on-vehicle engine, the control apparatus comprising:

a single battery serving as both of power supplying means providing current to the field winding for excitation thereof and storage means that is chargeable, the field winding having two terminals, the battery having positive and negative terminals and being directly connected to an output terminal of the generator;

a switching circuit having a switching element configured to be turned on and off to selectably and electrically connect or disconnect a current path between the field winding and the output terminal, the switching element including a first switch placed, through the output terminal, to connect one terminal of the field winding and the positive terminal of the battery and a second switch placed to connect the other terminal of the field winding and the negative terminal of the battery; and a regeneration circuit providing, through the output terminal, the storage means with the current flowing through the field winding depending on magnetic energy preserved in the field winding when the switching element is turned off, wherein the regeneration circuit includes a first diode placed to connect the one terminal of the field winding and the negative terminal of the battery and a second diode placed, through the output terminal, to connect the other terminal of the field winding and the positive terminal of the battery.

9. The control apparatus according to claim 8, wherein the switching element is placed in the switching circuit so that the current flowing through the field winding when the current is supplied to the battery is the same in a current flowing direction as the current flowing through the field winding when the battery provides the field winding with the current.

10. A control apparatus for use with an on-vehicle generator provided with a stator winding and a field winding and driven to rotate by an on-vehicle engine, the control apparatus comprising:

a single battery serving as both of power supplying means providing current to the field winding for excitation thereof and storage means that is chargeable, the field winding having two terminals, the battery having positive and negative terminals and being directly connected to an output terminal of the generator;

a switching circuit having a switching element configured to be turned on and off to selectably and electrically connect or disconnect a current path between the field winding and the output terminal, the switching element including a first switch placed, through the output terminal, to connect one terminal of the field winding and the positive terminal of the battery and a second switch placed to connect the other terminal of the field winding and the negative terminal of the battery; and a regeneration circuit providing, through the output terminal, the storage means with the current flowing through the field winding depending on magnetic energy preserved in the field winding when the switching element is turned off, wherein the regeneration circuit includes a first diode placed to connect the one terminal of the field winding and the negative terminal of the battery and a second diode placed, through the output terminal, to connect the other terminal of the field winding and the positive terminal of the battery; and an on/off control unit bringing each of the third and fourth switches into an off-state when each of the first and second switches are in an on-state and bringing each of the third and fourth switches into an on-state when each of the first and second switches are in an off-state.

11. The control apparatus according to claim 10, wherein the on/off control unit is configured to turn off both of the third and fourth switches when the current flowing through the field winding under the off-state of both of the first and second switches becomes zero.

12. The control apparatus according to claim 11, wherein the on/off control unit is configured to turn on and off both of the first and second switches at intervals of time less than $1/10$ of a time constant of the field winding.

13. The control apparatus according to claim 10, wherein the on/off control unit is configured to turn on and off both of the first and second switches at intervals of time less than $1/10$ of a time constant of the field winding.

14. The control apparatus according to claim 10, wherein the switching element is placed in the switching circuit so that the current flowing through the field winding when the current is supplied to the battery is the same in a current flowing direction as the current flowing through the field winding when the battery provides the field winding with the current.

* * * * *